United States Patent [19]
Garcia et al.

[11] Patent Number: 5,607,792
[45] Date of Patent: Mar. 4, 1997

[54] BATTERY LATCH

[75] Inventors: Jorge L. Garcia, Plantation; Craig F. Siddoway, Davie; Faris S. Habbaba, Boca Raton, all of Fla.

[73] Assignee: Motorola, Inc., Schaumburg, Ill.

[21] Appl. No.: 595,444

[22] Filed: Feb. 5, 1996

[51] Int. Cl.⁶ ................................................. H01M 2/10
[52] U.S. Cl. ........................... 429/97; 429/98; 429/123
[58] Field of Search ........................... 429/96–100, 123; 455/89, 90, 347–349; 361/434, 600, 814

[56]  References Cited

U.S. PATENT DOCUMENTS 5,314,763  5/1994  Aksoy et al. .................... 429/97
5,415,955  5/1995  Kobayashi et al. ............... 429/97
5,460,906  10/1995 Leon et al. ...................... 429/97

*Primary Examiner*—Anthony Skapars
*Attorney, Agent, or Firm*—Andrew S. Fuller

[57]  ABSTRACT

A removable battery package (120) has a latch assembly (200) for attaching to a latch coupler (700) of an electronic device (110). The removable battery package (120) includes a socket (432) that mates with the latch coupler (700). A resilient, deflectable latch member (260) is secured within the socket (432). The latch member (260) has a latch portion (266, 268) to engage a portion (715) of the latch coupler (700). A button (270), mounted on the latch member (260), is depressible to deflect the latch member (260).

17 Claims, 3 Drawing Sheets

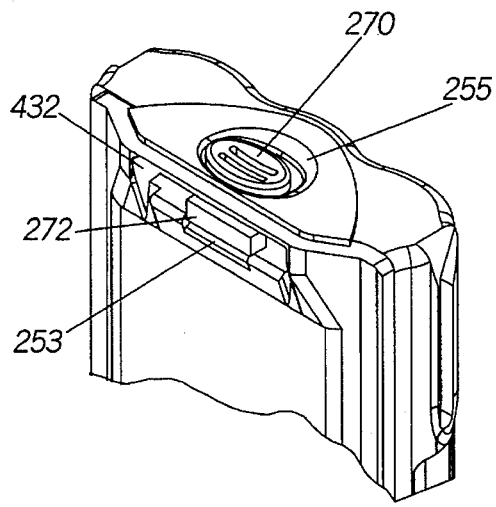
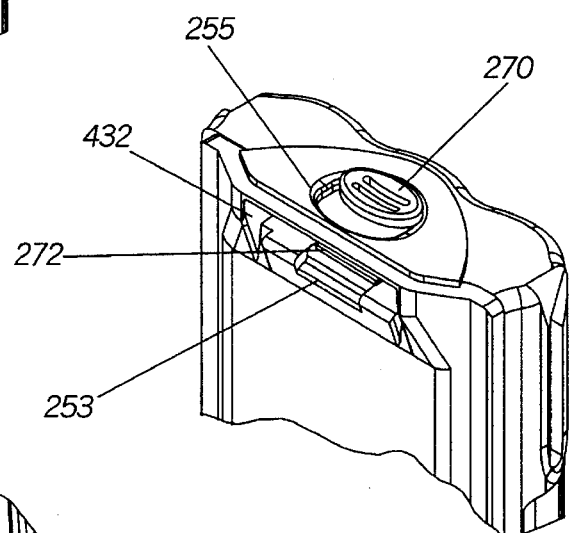
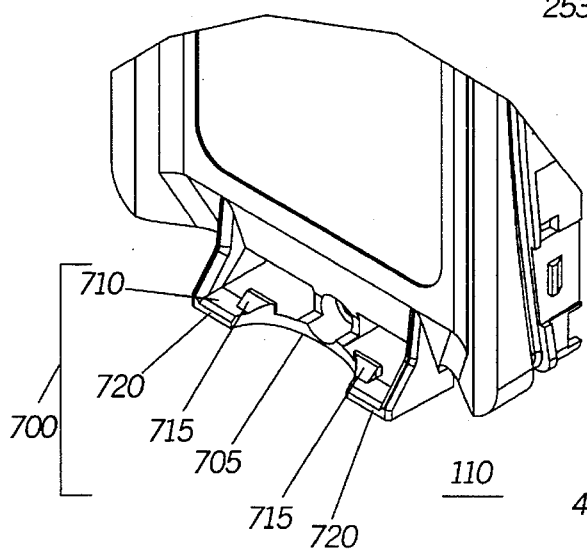
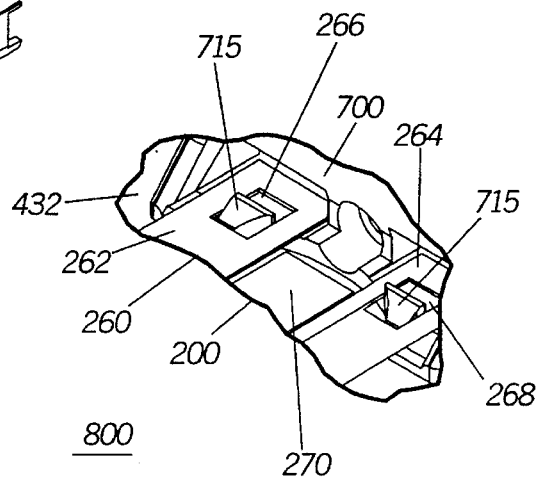

BATTERY LATCH

TECHNICAL FIELD

This invention relates in general to latch devices, and more particularly, latch devices for removable battery packages for portable electronic products.

BACKGROUND

Portable electronic devices, such as two-way radios and telephones, often have removable battery packages for supplying power. In many such configurations, a removable battery package is secured to a host electronic device by a latch system. The latch system ordinarily includes a portion situated on the battery package, and a portion situated on the host device that mate together to secure the battery package to the host device.

In one prior art approach, the latch system includes a catch on the battery package that engages a movable latch member on the host device. A user removes the battery package from the host device by pushing on the movable latch member to disengage the latch member from the catch. One problem with this approach is the cost of repair when the movable latch member on the host device is defective or is otherwise damaged. The host device must often be disassembled to replace the movable latch member, which can result in substantial expense.

In another prior art approach, the latch system incorporates a substantially rigid structural member on the radio, and a movable latch member on the battery package. Generally, removable battery packages have a shorter life span than host electronic devices, and are substantially less expensive. Hence, a defective or broken latch on the battery package does not result in a high replacement cost relative to a the replacement cost on the electronic device. Moreover, it is likely that the battery package will be replaced before the movable latch member is worn.

In a typical battery package configuration having a movable latch member, a button or other actuator is mechanically coupled to a deflectable member that has a catch for hooking onto a fixed portion of the host device. A common problem with these latch systems is that of weak attachment between the battery package and the host device. Another problem is that of difficulty of operation. It is desirable that a latch system is strong, reliable, and easy to use. Yet, the latch system should be easily manufacturable in a cost effective manner. The prior art does not adequately address these issues. Accordingly, a new latch system for a removable battery package is needed.

BRIEF DESCRIPTION OF THE DRAWINGS

FIG. 5 is a fragmentary view of the battery package showing the button in an unlocked position, in accordance with the present invention.

FIG. 6 is a fragmentary view of the battery package showing the button in a locked position, in accordance with the present invention.

FIG. 7 is a fragmentary, perspective view of the radio housing highlighting a latch coupler, in accordance with the present invention.

FIG. 8 is a fragmentary, perspective view of a portion of the radio and battery assembly showing the latch coupler engaged with the latch assembly, in accordance with the present invention.

DETAILED DESCRIPTION OF THE PREFERRED EMBODIMENT

Generally, the present invention provides for a battery latch system for securing a removable battery package to an electronic device. The battery latch system includes a latch coupler on the electronic device and a latch assembly on the battery package. The latch assembly includes a socket on the housing of the battery package that mates with the latch coupler. A resilient, deflectable latch member is secured within the socket. The latch member has a portion that engages with the latch coupler. A button, mounted on the latch member, is depressible to deflect the latch member. In one embodiment, the button is slidable along the latch member between a locked and an unlocked position. When in the unlocked position, the button is movable to deflect the latch member. When in the locked position, movement of the button is substantially restricted.

Figure 1:
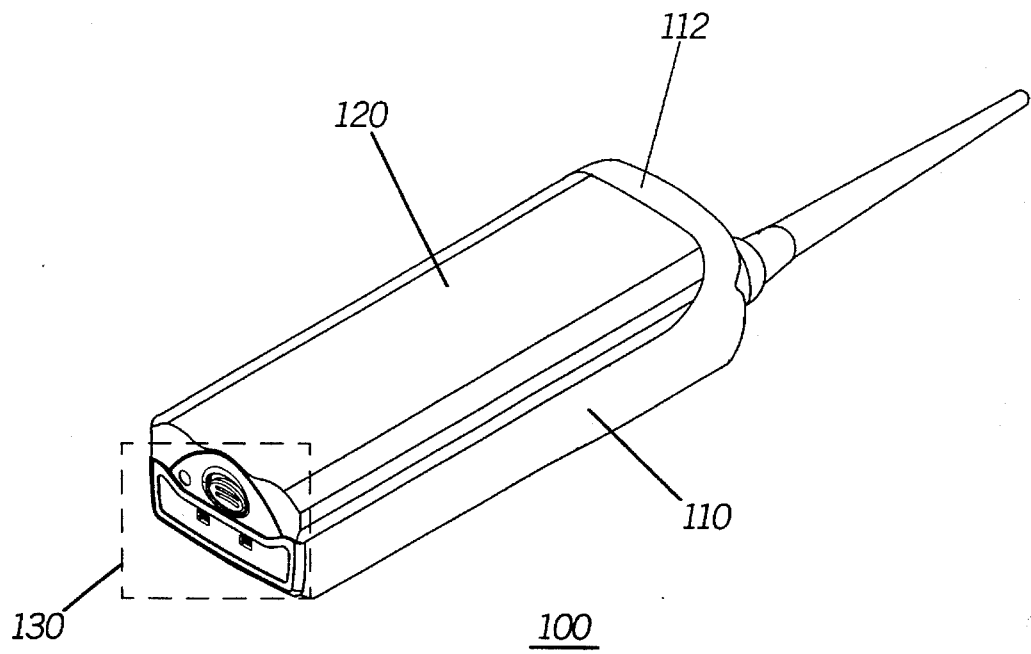
FIG. 1 is a perspective view of an electronic device and battery assembly, in accordance with the present invention.

FIG. 1 is a perspective view of an electronic device and battery assembly 100, in accordance with the present invention. In the preferred embodiment, the electronic device is a two-way portable radio having circuitry for communicating over radio frequency channels. The battery provides power to operate the radio. The assembly 100 includes a radio housing 110, and a removable battery package 120 attached to the radio housing 110. The battery package 120 is secured to the radio housing 110 via a lip portion 112 on the radio, and by a battery latch system 130 having a portion on the battery package 120 and a portion on the radio housing 110.

Figure 2:
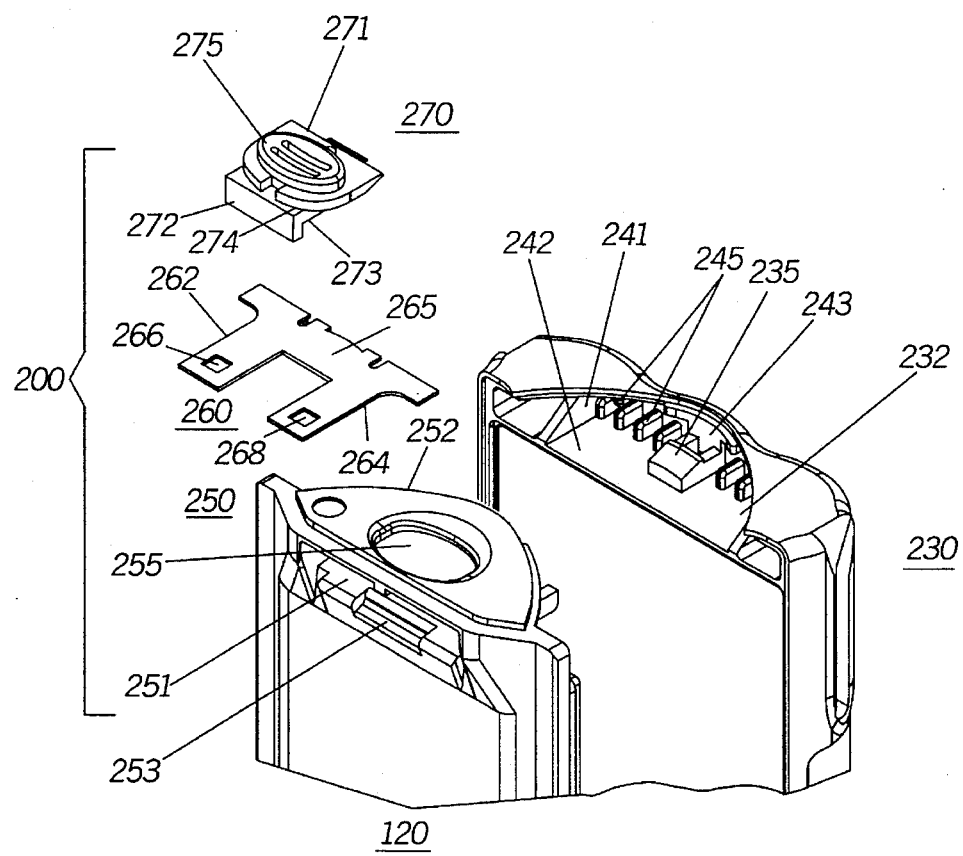
FIG. 2 is a fragmentary, exploded, perspective view of the battery package, in accordance with the present invention.

FIG. 2 is a fragmentary, exploded, perspective view of the battery package 120, in accordance with the present invention. The battery latch assembly 200 constitutes the portion of the battery latch system on the battery package. The battery latch assembly 200 is formed from a portion of a battery housing member 230, a portion of a second battery housing member or battery cover 250, a latch member 260, and a button 270.

The battery housing member 230 is preferably formed from plastic in a single piece mold construction. The battery housing member 230 has a latch mount portion 232 in the form of a recess or cavity in the battery housing member 230. The latch mount portion 232 is defined by a plurality of sidewalls 241, 242, 243, that form the surfaces of the latch mount portion 232. Projections 245 extend from at least one surface 243 to define a narrow or restricted access latch member mount channel. The latch mount portion 232 further includes a raised portion or projection 235 extending within the cavity that forms a retention member or stop for the latch member 260. Thus, the projections 245 form mount guides for mounting the latch member 260, and the raised portion 235 serves to secure the latch member 260.

The latch member 260 is a resilient cantilever structure preferably formed from stamped sheet metal. In the preferred embodiment, the latch member 260 includes two resilient cantilever arms 262, 264 connected by a bridge member 265. Each cantilever arm 262, 264 has a latch portion or catch 266, 268. Preferably, the catch is a slot extending through an end portion of the cantilever arm.

The button 270 is preferably formed from molded plastic. The button 270 has finger grip portion 275 formed on a platform 271. A mount base 273 extends from beneath the platform to form a groove 274 between the platform 271 and the mount base 273. A protrusion 272 extends from the mount base 273 to form a stop or locking feature for the latch assembly.

Figure 3:
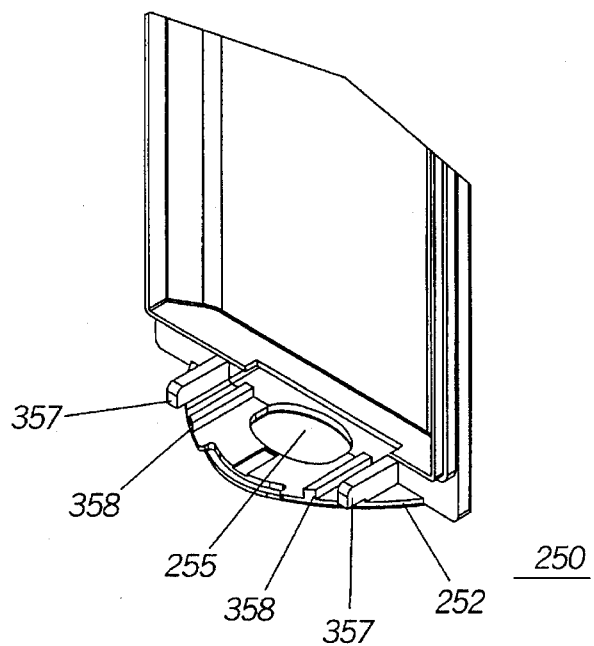
FIG. 3 is a fragmentary perspective view showing the underside or bottom surface of the battery cover of FIG. 2, in accordance with the present invention.

The battery cover 250 is preferably formed from molded plastic. The battery cover 250 attaches to the battery housing member 230 to form an enclosure. The battery cover 250 has a overhang wall portion 252 extending over the latch mount portion 232 of the battery housing member 230. The battery cover 250 has a button hole 255 for accommodating the button 270. The button hole 255 is preferably sufficiently large to allow the finger grip portion 275 of the button 270 to have a lateral range of movement within the button hole. The battery cover 250 also has a passage 251 extending therethrough that provides access to the latch member 260. A notch 253, formed along a surface defining the passage 251, accommodates the protrusion 272 of the button to support the locking and unlocking feature of the latch assembly. FIG. 3 is a fragmentary perspective view showing the underside or bottom surface of the battery cover 250. On the bottom surface, the battery cover 250 includes projections 358 that extend to form spacers for biasing and pre-loading the cantilever arms 266, 264 of the latch member 260. Latch member retainers 357 are also formed on the battery cover 250 to aid in securing the latch member 260 within the latch assembly 200.

Figure 4:
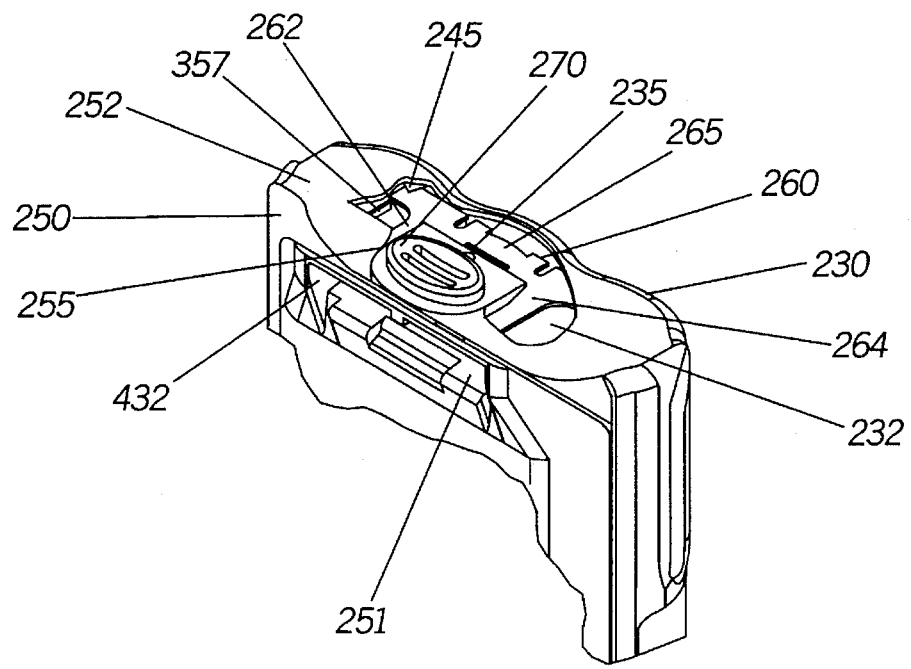
FIG. 4 is a fragmentary, cut away view of the battery package showing a fully assembled latch assembly, in accordance with the present invention.

FIG. 4 is a fragmentary, cut away view of the battery package showing a fully assembled latch assembly, in accordance with the present invention. The battery cover 250 is attached to the battery housing member 230. The overhang wall portion 252 of the battery cover fits over the recessed latch mount portion 232 of the battery housing, and together with the passage 251 of the battery cover 250, form an open face enclosure or latch socket 432 that houses the latch member 260. As the latch member 260 is enclosed within the latch socket 432, it is protected from damage when the battery package is dropped accidentally.

The latch member 260 is mounted within the latch mount portion 232 such that the bridge member 265 engages the retention member 235 to secure the latch member 260 within the latch mount portion 232. The latch member 260 is further secured within the latch mount portion 232 by the latch member retainers 357. The latch member 260 is disposed or mounted within the latch socket such that is resilient and deflectable. The cantilever arms 262, 264 extend within the latch socket. The button 270 is slidably mounted on latch member 260, preferably between the cantilever arms 262, 264. The button hole 255 on the battery cover 250 is positioned over the latch member 260 and aligned with the button 270. The latch member 260 is accessible through the passage 251 that forms the open face of the latch socket 432.

The button 270 is slidable along the latch member to provide a lock and unlock position. FIGS. 5 and 6 are fragmentary portions of the removable battery package highlighting the lock and unlock feature of the latch assembly. In FIG. 5, the button 270 is moved laterally within the button hole 255, along the latch member, such that the protruded portion 272 is aligned with the corresponding notch portion 253 in the latch socket 432. In this orientation, the button 270 is movable or depressible, so as to cause substantial deflection in the cantilever arms 262, 264 of the latch member 260. In FIG. 6 the button 270 is shown moved within the button hole 255 to a locked position. Here, movement of the button 270, so as to depress the button 270, is substantially restricted. The protrusion 272 abuts against a portion of the battery cover to prevent or restrict substantial deflection of the cantilever arms 262, 264 of the latch member 260 when the button 270 is depressed. Accordingly, the button 270 is slidably along the cantilever arms 262, 264 between a locked and unlocked position. In an alternative embodiment, the lock/unlock feature could be provided by reversing the location of the protrusion 272 and corresponding notch 253. For example, the notch could be located within the button 270, and the protrusion extending within the latch socket 432.

FIG. 7 is a fragmentary, perspective view 700 of the radio housing highlighting a portion of the latch system, in accordance with the present invention. The radio housing 110 includes a latch coupler or plug portion 700 that mates with the latch assembly 200 of the battery package 120. The latch coupler 700 has catches 715 that correspond to the catches 266, 268 on the latch member 260 of the latch assembly 200. In the preferred embodiment, the catches are protrusions extending from one surface 710 of the latch coupler 700. The latch coupler 700 further includes tabs 720 to aid in disassembling the latch coupler from the mount socket when the latch coupler 700 is mounted improperly. A concave surface 705 accommodates or receives the button 270 so as not to interfere with the button assembly when the latch coupler 700 is mated to the latch assembly 200.

FIG. 8 is a fragmentary, perspective view of a portion of the radio and battery assembly 800 showing the latch coupler 700 engaged with the latch assembly 200, in accordance with the present invention. The latch coupler 700 is mated with the latch socket 432 such that the latch member 260 biasly engages the latch coupler 700. The catches 266, 268 of the latch member 260 engage the catches 7 15 of the latch coupler to secure the battery package to the radio housing. The button is depressible to deflect the latch member to disengage the latch member from the latch coupler, thereby releasing the battery package from the radio housing.

The present invention provides for significant benefits. The battery latch system provides a reliable, rugged, easily operable, latch mechanism with a locking option. Most of the latch system components are molded into the battery package housing and others are easily assembled to provide a highly manufacturable, cost effective solution.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A removable battery package having a latch assembly for attaching to an electronic device, the electronic device having a latch coupler, the removable battery package comprising:

a battery housing having a socket that mates with the latch coupler;

a latch member secured within the socket, the latch member being resilient and deflectable, and being biased in a first position, the latch member having a latch portion for engaging the latch coupler; and a button mounted on the latch member, the button being depressible to deflect the latch member to a second position.

2. The battery package of claim 1, wherein:

the button is slidable along the latch member between a locked position and an unlocked position;

the button is movable to deflect the latch member to the second position when the button is in the unlocked position; and movement of the button is substantially restricted when the button is in the locked position.

3. The battery package of claim 1, wherein the socket is defined by a plurality of sidewalls including at least one sidewall having a button hole extending therethrough.

4. The battery package of claim 3, wherein the battery housing comprises a first battery housing member, the first battery housing member having a cavity portion defined by first and second surfaces, the first surface having projections extending therefrom, the second surface having projections that terminate adjacent to corresponding projections of the first surface to define a narrow channel, the first battery housing member having a raised portion extending within the cavity portion.

5. The battery package of claim 4, wherein the socket is defined by a second battery housing member attached to the first battery housing member and having a overhanging wall extending over the cavity portion to define the socket, the overhanging wall forming the at least one sidewall.

6. The battery package of claim 5, wherein the latch member is fitted within the narrow channel and secured by the raised portion.

7. The battery package of claim 6, wherein the latch member comprises two extending arms connected by a bridge member, each extending arm having a slot therein.

8. The battery package of claim 1, wherein the latch member comprises stamped metal.

9. A electronic device and battery assembly, comprising:

a electronic device housing having a latch coupler;

a battery housing having a latch socket;

a latch member disposed within the latch socket, the latch member being resilient and deflectable;

a button movably mounted within the battery housing to selectively deflect the latch member;

wherein:
the latch coupler is selectively mated with the latch socket such that the latch member biasly engages the latch coupler, thereby securing the battery housing to the electronic device housing; and the button is depressible to deflect the latch member thereby disengaging the latch member from the latch coupler, thereby releasing the battery housing from the electronic device housing.

10. The electronic device and battery assembly of claim 9, wherein the button is mounted on the latch member.

11. The electronic device and battery assembly of claim 10, wherein:

the button is slidable along the latch member between a locked position and an unlocked position;

the button is movable to deflect the latch member when the button is in the unlocked position; and movement of the button is substantially restricted when the button is in the locked position.

12. The electronic device and battery assembly of claim 10, wherein the latch member comprises at least one cantilever member having a catch that couples to at least a portion of the latch coupler.

13. The electronic device and battery assembly of claim 10, wherein the latch socket is defined by a plurality of sidewalls including at least one sidewall having a button hole extending therethrough, and wherein the button extends through the button hole.

14. The electronic device and battery assembly of claim 10, wherein the battery housing comprises:

a first battery housing member having a recessed portion, the recessed portion having mount guides for mounting and securing the latch member; and a second battery housing member attached to the first battery housing member and having a overhang extending over the recessed portion to define the latch socket.

15. A radio and battery assembly, comprising:

a radio housing member having a latch coupler;

a removable battery package selectively attached to the radio housing member, the removable battery package having a latch assembly, the latch assembly being mated with the latch coupler when the removable battery package is attached to the radio housing member, the latch assembly comprising:

a battery housing having a mount socket, and a button hole adjacent to the mount socket;

a cantilever member secured within the mount socket, the cantilever member having a catch;

a button mounted to the cantilever member and being biased by the cantilever member, the button being movably positioned within the button hole;

wherein the catch of the cantilever member engages the latch coupler, and button is movable to deflect the cantilever member to disengage the catch from the latch coupler.

16. The radio and battery assembly of claim 15, wherein:

the button is slidable along the cantilever member between a locked position and an unlocked position;

the button is movable to deflect the cantilever member when the button is in the unlocked position; and movement of the button is substantially restricted when the button is in the locked position.

17. A battery latch assembly, comprising:

a battery housing member having a latch mount portion defined therein, the latch mount portion having a retention member;

a latch member comprising at least two resilient cantilever arms connected by a bridge member, the latch member being mounted within the latch mount portion such that the bridge member engages the retention member to secure the latch member within the latch mount portion;

a battery cover attached to the battery housing member, the battery cover having a portion mounted over the latch member, the battery cover having a button hole positioned over the latch member, the battery cover having a passage that provides access to the latch member;

a button mounted to the latch member and aligned with the button hole such that a portion of the button is accessible through the button hole;

a device housing, the device housing having a latch coupler, the latch coupler comprising at least two catches;

wherein the cantilever arms of the latch member biasly engage the latch coupler such that the at least two catches secure the latch member, when the latch member is mated with the latch coupler;

wherein the button engages the latch member to deflect the cantilever arms, thereby disengaging the cantilever arms from the at least two catches, when the button is depressed.

* * * * *